United States Patent
Nakagawa

(10) Patent No.: US 7,933,047 B2
(45) Date of Patent: Apr. 26, 2011

(54) FACSIMILE APPARATUS, ITS CONTROL METHOD, PROGRAM AND STORAGE MEDIUM

(75) Inventor: Kaori Nakagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 887 days.

(21) Appl. No.: 11/858,192

(22) Filed: Sep. 20, 2007

(65) Prior Publication Data

US 2008/0088884 A1  Apr. 17, 2008

(30) Foreign Application Priority Data

Oct. 12, 2006  (JP) .................................. 2006-278917

(51) Int. Cl.
*H04N 1/00*  (2006.01)

(52) U.S. Cl. ....... 358/400; 358/405; 358/434; 358/1.15; 379/100.16; 379/93.09; 370/356; 370/352

(58) Field of Classification Search .................. 358/1.15, 358/434, 442, 404, 468, 400, 405; 379/207.03, 379/100.16, 93.09, 100.14, 198, 156, 212.01; 370/356, 458, 480, 352, 330, 436, 316
See application file for complete search history.

(56) References Cited

U.S. PATENT DOCUMENTS

| 4,558,357 | A |  | 12/1985 | Nakagawa et al. | 358/75 |
|---|---|---|---|---|---|
| 4,763,189 | A |  | 8/1988 | Komatsu et al. | 358/75 |
| 4,886,962 | A |  | 12/1989 | Gofuku et al. | 250/211 |
| 5,121,391 | A | * | 6/1992 | Paneth et al. | 370/341 |
| 5,544,234 | A |  | 8/1996 | Terajima et al. | 379/100 |
| 5,555,100 | A | * | 9/1996 | Bloomfield et al. | 358/402 |
| 5,563,932 | A |  | 10/1996 | Tachibana et al. | 379/100 |
| 5,974,123 | A |  | 10/1999 | Nakayama et al. | 379/100 |
| 6,128,293 | A | * | 10/2000 | Pfeffer | 370/359 |
| 6,301,339 | B1 | * | 10/2001 | Staples et al. | 379/93.01 |
| 6,571,109 | B1 | * | 5/2003 | Kim | 455/555 |
| 6,603,569 | B1 | * | 8/2003 | Conklin et al. | 358/1.15 |
| 7,068,684 | B1 | * | 6/2006 | Suder et al. | 370/493 |
| 7,123,699 | B2 | * | 10/2006 | Suder et al. | 379/88.18 |
| 7,446,906 | B2 | * | 11/2008 | Bloomfield | 358/407 |
| 2002/0089975 | A1 | * | 7/2002 | Vaziri et al. | 370/352 |
| 2003/0067895 | A1 | * | 4/2003 | Paneth et al. | 370/330 |
| 2004/0022373 | A1 | * | 2/2004 | Suder et al. | 379/88.11 |
| 2005/0146754 | A1 | * | 7/2005 | Firooz | 358/440 |
| 2007/0127455 | A1 | * | 6/2007 | Fujioka | 370/356 |
| 2008/0013531 | A1 | * | 1/2008 | Elliott et al. | 370/356 |

FOREIGN PATENT DOCUMENTS

| CN |  | 1044563 A |  | 8/1990 |
| JP |  | 2002-232519 |  | 8/2002 |

\* cited by examiner

*Primary Examiner* — Negussie Worku

(74) *Attorney, Agent, or Firm* — Fitzpatrick, Cella, Harper & Scinto

(57) ABSTRACT

When facsimile data is transmitted by performing facsimile communication, a public line is seized. Then, when the public line is seized, it is a determined which of a dial tone signal or a voice signal for phone call a signal received from the public line is, it is controlled to perform the facsimile communication in a case where the received signal is determined as the dial tone signal, and it is controlled not to perform the facsimile communication in a case where the received signal is determined as the voice signal.

17 Claims, 10 Drawing Sheets

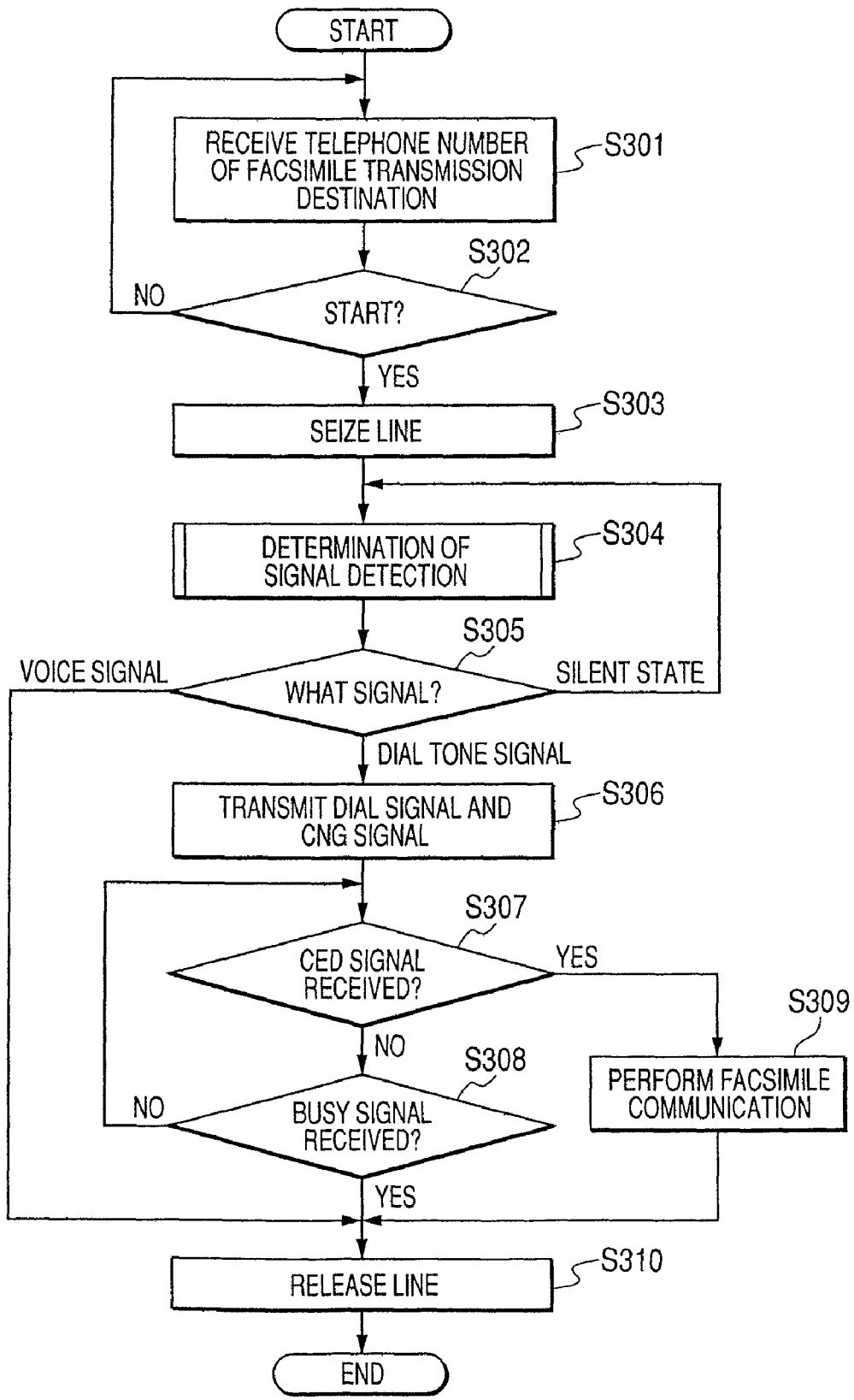

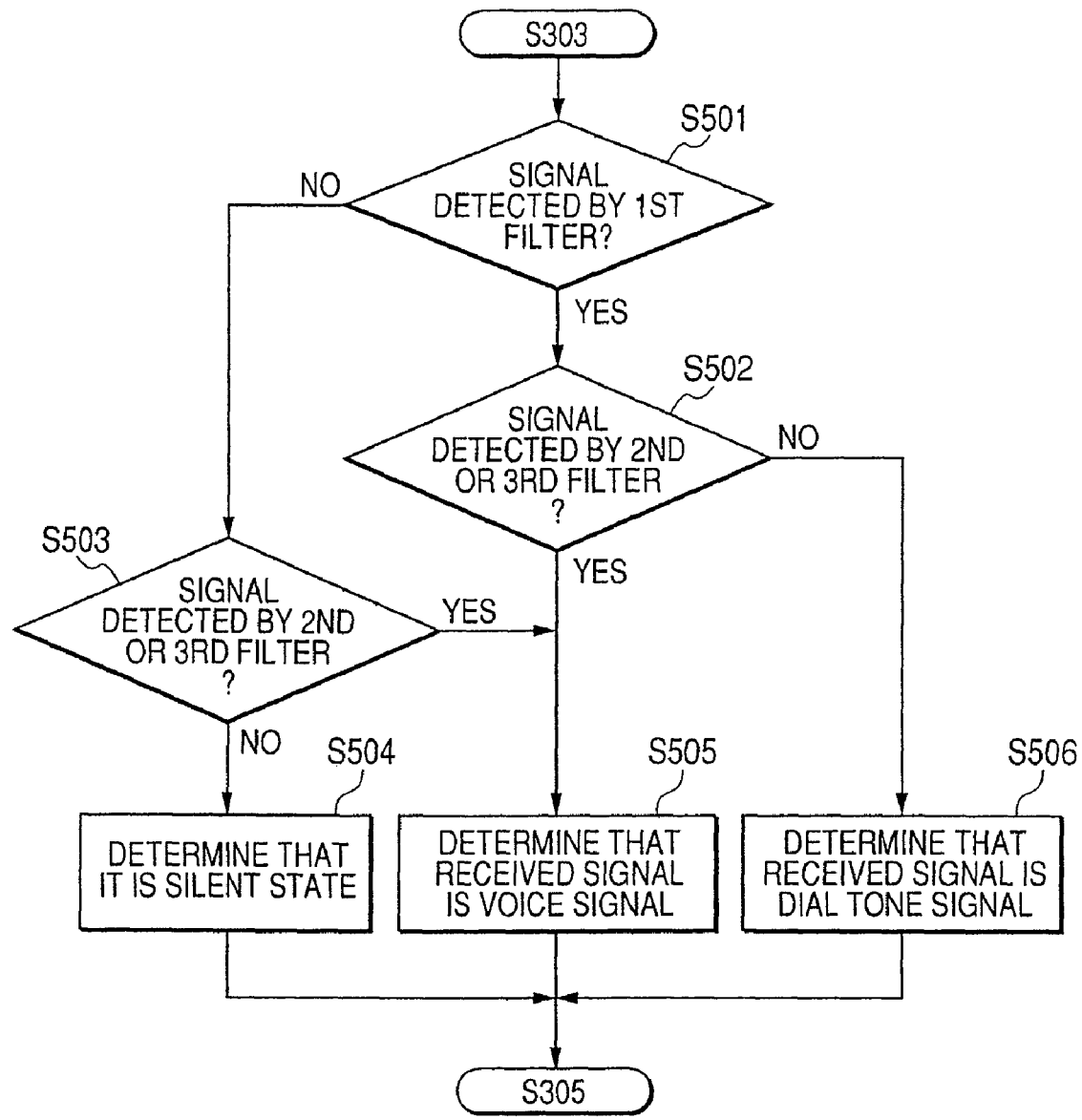

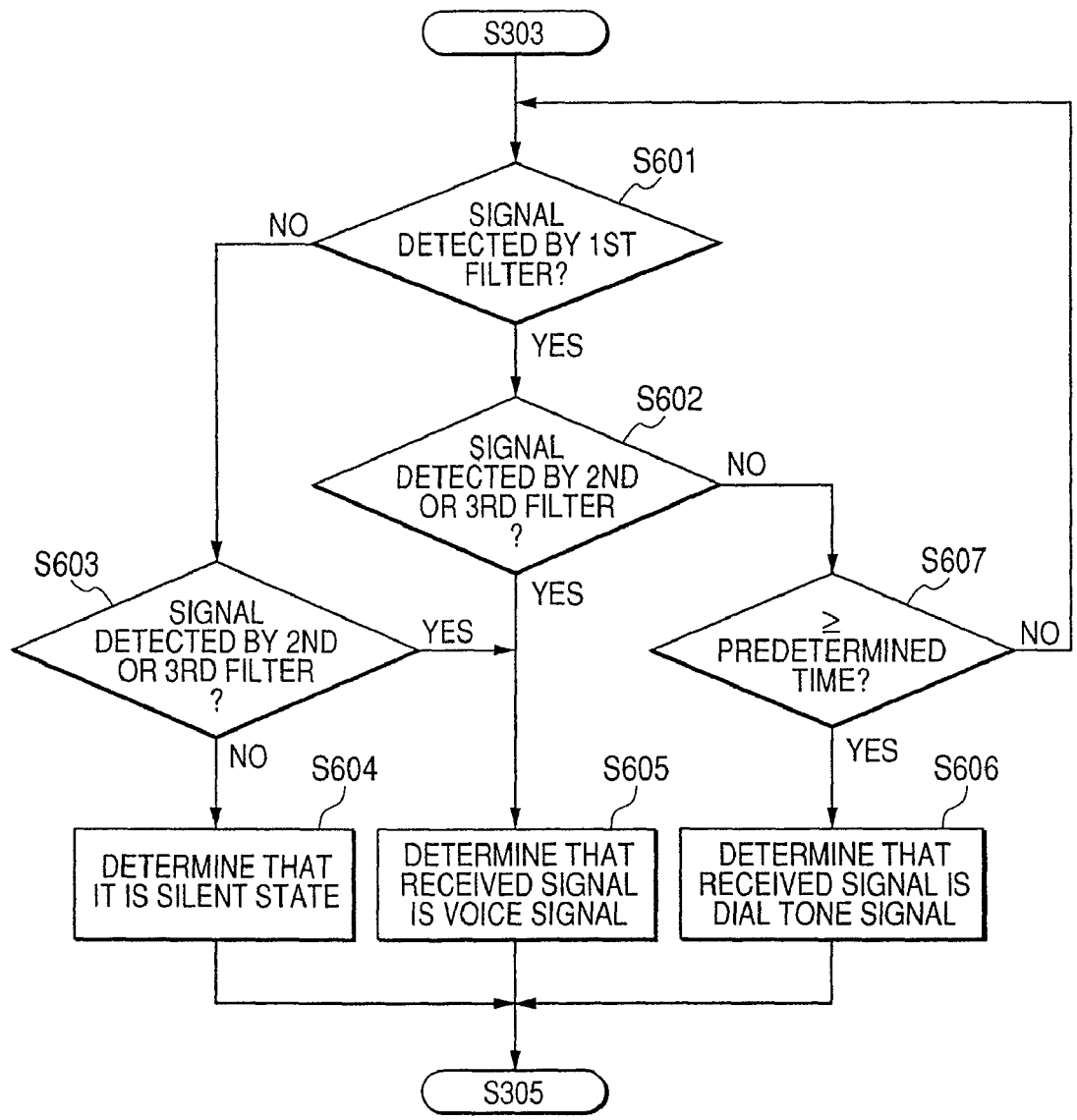

FACSIMILE APPARATUS, ITS CONTROL METHOD, PROGRAM AND STORAGE MEDIUM

BACKGROUND OF THE INVENTION

1. Field of the Invention

The present invention relates to a facsimile apparatus which transmits data through facsimile communication, a control method for the facsimile apparatus, a program for performing the control method, and a storage medium for computer-readably storing the program.

2. Description of the Related Art

Conventionally, a technique for transmitting facsimile data by performing facsimile communication with a partner's terminal through an exchanging system has been known. In this technique, a terminal on a transmission side (hereinafter called a transmission-side terminal) first seizes a public line (telephone circuit) to be used for the facsimile communication. Then, the transmission-side terminal, which could seize the public line, detects a dial tone signal received from the exchanging system. Here, it should be noted that the dial tone signal is a signal which is transmitted from the exchanging system to the transmission-side terminal to notify that communication (calling) can be performed, when it is detected by the exchanging system that an on-hook state of the transmission-side terminal has been changed to an off-hook state.

Then, the transmission-side terminal, which detected the dial tone signal, dials a telephone number of a terminal on a reception side (hereinafter called a reception-side terminal) which is the destination to which the facsimile data is to be transmitted, and also transmits a CNG (calling) signal. Here, it should be noted that the CNG signal is a signal which is first output before an operation comes into a facsimile procedure, and also is a signal which is to be transmitted to a transmission channel to notify that a calling station is a non-voice terminal. Then, the reception-side terminal, which received the CNG signal, returns a CED (called) signal to the transmission-side terminal. Here, it should be noted that the CED signal is a signal which notifies that a called station is a non-voice terminal. Subsequently, the transmission-side terminal, which received the CED signal, starts facsimile communication with the reception-side terminal.

Here, a method of detecting the dial tone signal by referring to frequencies and signal patterns thereof is known (for example, Japanese Patent Application Laid-Open No. 2002-232519). In this method, the frequencies and signal patterns of the dial tone signals to be detected have been stored previously, whereby a user can detect the desired dial tone signal by referring to the corresponding frequency and pattern previously stored.

However, such a related art as described above includes a following problem.

Here, the problem, which occurs in the related art, will be described in detail with reference to FIG. 10. For example, in a case where a terminal A transmits facsimile data to a terminal B, there is a possibility that a call for phone call is received from a terminal C different from the terminal B to the terminal A by chance at timing same as that when a line is seized by the terminal A. Like this, if the line seizing operation by the terminal A (1001) conflicts with the call reception from the terminal C (1002), a call from the terminal A to the terminal B is not performed. Instead, the line is connected between the terminal A and the terminal C (1003).

Then, it is conceivable that, after the line was seized, a voice signal for phone call is transmitted from the terminal C to the terminal A which is in a state (1006) of waiting for a dial tone signal from an exchanging system to transmit a dial signal (1004, 1005). Consequently, in the above related art, there is a fear that the voice signal transmitted from the terminal C is erroneously recognized by the terminal A as the dial tone signal transmitted from the exchanging system (1007). That is, in Japanese Patent Application Laid-Open No. 2002-232519, frequencies of the dial tone signal have previously been stored as a detection condition, and a signal which conforms to one of the stored frequencies is detected as the dial tone signal. Here, in FIG. 10, if the voice signal (1004, 1005) transmitted from the terminal C includes a signal of which the frequency conforms to the frequency included in the detection condition, the relevant voice signal (1005) is detected by the terminal A as the dial tone signal transmitted from the exchanging system.

Then, the terminal A, which erroneously recognized that the dial tone signal was received from the exchanging system, dials a telephone number of the terminal B which is a real (or right) destination (1008). Also, the terminal A transmits a CNG signal to the terminal B (1010). However, since the line has been already connected between the terminal A and the terminal C, the exchanging system does not recognize the dial signal to be transmitted to the terminal B, and the dial signal is thus transmitted to the terminal C (1009). In addition, the CNG signal from the terminal A is transferred to the terminal C as it is (1011).

Even in a case where the terminal C receives the CNG signal while performing phone call, it is assumed that the terminal C has a function to automatically change a phone call mode to a facsimile mode and transmit the CED signal for facsimile data reception. That is, the terminal C, which received the CNG signal from the terminal A (1012), automatically changes its phone call mode to the facsimile mode (1013), and transmits the CED signal to the terminal A (1014).

The terminal A which received the CED signal from the terminal C (1015) determines that the line connection with the terminal B has ended, starts facsimile communication, and thus transmits the facsimile data, which is to be originally transmitted to the terminal B, to the terminal C (1016). By such an operation, the problem that the facsimile data that a user of the terminal A originally intended to transmit to the terminal B is erroneously transmitted to the terminal C occurs. In particular, if the transmitted facsimile data includes a high-confidential important content, for example, a serious problem of leakage of confidential information occurs.

SUMMARY OF THE INVENTION

The present invention, which has been completed in consideration of the above-described conventional problem, aims to provide a facsimile apparatus which can prevent, in case of transmitting facsimile data, a voice signal for phone call from being erroneously recognized as a dial tone signal, a control method for the facsimile apparatus, a program for achieving the control method, and a storage medium for storing the program.

The present invention provides a facsimile apparatus comprising: a communication unit configured to perform facsimile communication; a line seizing unit configured to seize a public line in order to transmit facsimile data by the facsimile communication; a determining unit configured to determine, in a case where the line seizing unit has seized the public line, which of a dial tone signal or a voice signal for phone call a signal received from the public line is; and a control unit configured to control the communication unit to perform the facsimile communication in a case where the received signal is determined as the dial tone signal, and not to perform the facsimile communication in a case where the received signal is determined as the voice signal, a control method for the facsimile apparatus, a program for achieving the control method, and a storage medium for storing the program, which all overcome the above-described conventional problem.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments of the present invention and, together with the description, serve to explain the principle of the present invention.

FIG. 3 is a flow chart for clearly describing a series of processes for transmitting facsimile data according to the embodiment of the present invention.

FIG. 5 is a flow chart for clearly describing a series of processes for determining a dial tone signal or a voice signal according to the embodiment of the present invention.

FIG. 6 is a flow chart for clearly describing a series of processes for determining the dial tone signal or the voice signal according to the embodiment of the present invention.

DESCRIPTION OF THE EMBODIMENTS

Hereinafter, exemplary embodiments of the present invention will be described.

First Embodiment

Figure 1:
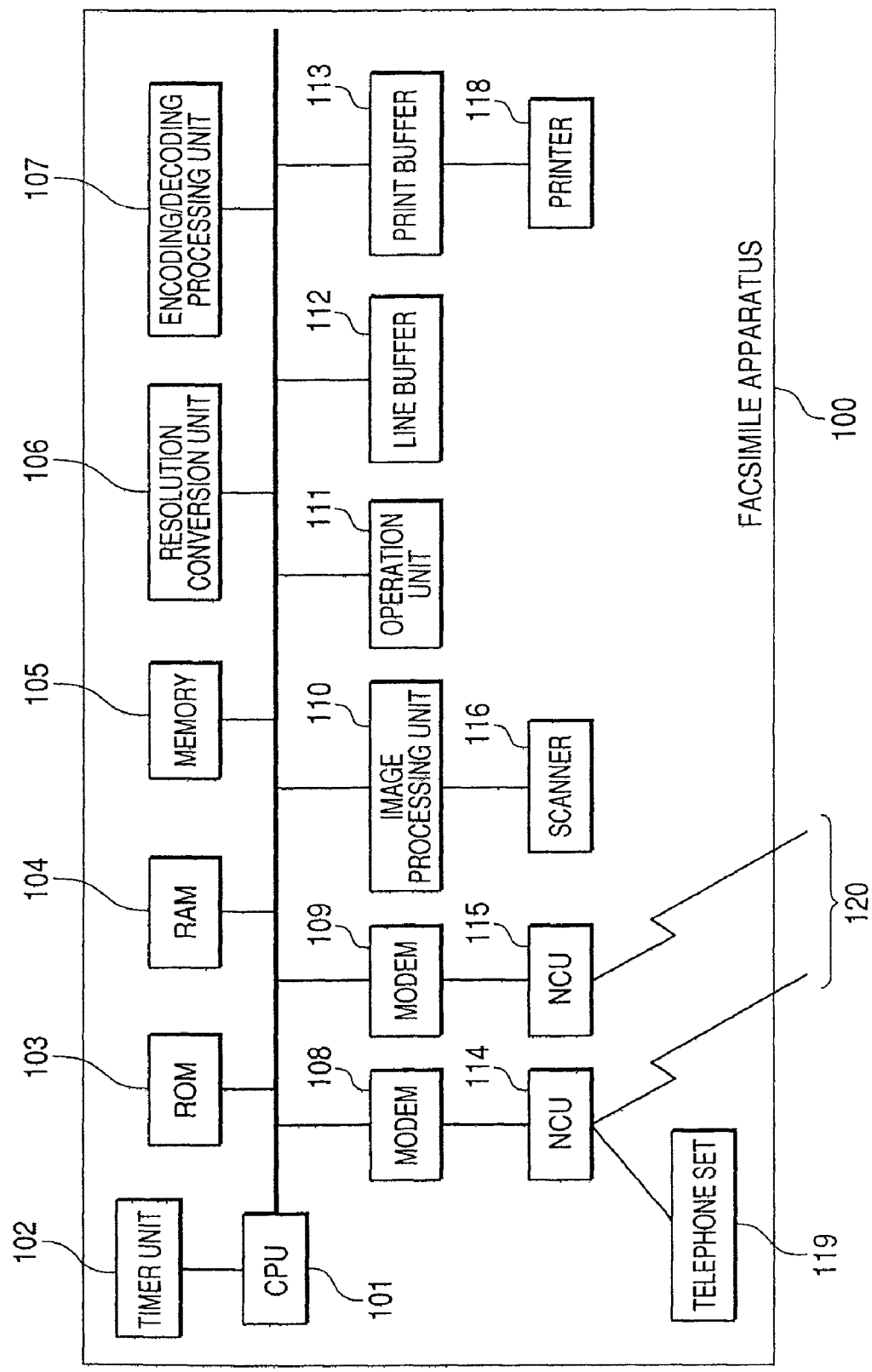
FIG. 1 is a block diagram illustrating a system constitution of a facsimile apparatus according to the embodiment of the present invention.

FIG. 1 is a block diagram illustrating a system constitution of a facsimile apparatus according to the first embodiment of the present invention. In FIG. 1, a facsimile apparatus 100 is equipped with a facsimile function for transmitting and receiving facsimile data by performing facsimile communication, and a telephone function for performing phone call by voice. A CPU 101 functions as a system control unit for controlling the whole of the facsimile apparatus 100. Plural kinds of control programs for executing the respective functions provided by the facsimile apparatus 100 have been stored in a ROM 103. Namely, the CPU 101 reads the control programs from the ROM 103, and executes the read programs.

A RAM 104 includes an SRAM (static RAM) and the like, in which various kinds of data such as image data, device setting information and the like can be stored. A memory 105 includes a DRAM (dynamic RAM) and the like, in which various kinds of data such as image data, communication management information and the like can be stored.

A resolution conversion unit 106 performs a resolution conversion process to acquire resolution that a communication partner can receive, and an encoding/decoding processing unit 107 performs a process for encoding and decoding image data to be managed in the facsimile apparatus 100. Each of modems 108 and 109 demodulates a signal transmitted from a public line (exchanging system), and modulates a signal to be transmitted to the public line.

Each of NCU's (network control units) 114 and 115 functions as an interface between the facsimile apparatus 100 and the public line. As illustrated in FIG. 1, if there are plural lines (that is, if the plural NCU's are provided), there are plural telephone connection terminals. Thus, if plural telephone sets are connected to the respective telephone connection terminals, on-hook/off-hook is detected independently for each telephone set. For example, a telephone set 119, which is connected to the public line through the NCU 114, is a handset (that is, a telephone set not including a dialer), an external telephone set (that is, an answering machine, etc.), or the like. Further, lines 120 are respectively connected to the public line, a private branch exchanging system, and the like.

An image processing unit 110 performs various kinds of correction processes to image data read by a scanner 116. Here, the scanner 116, which includes an image sensor, an original feeding mechanism and the like, optically reads an image on an original, converts the read image into electrical image data, and then inputs the converted image data to the image processing unit 110.

An operation unit 111, which includes a keyboard, an LCD and the like, accepts various kinds of operation information input by a user. In case of telephone calling or facsimile calling, the user inputs a telephone number of a destination terminal through the operation unit 111.

A line buffer 112 is a buffer memory which is used to control image data transfer, and a print buffer 113 is a buffer memory of one page which is used to store print character codes. Further, a printer 118 prints various data such as facsimile-received image data and the like onto a print medium such as a print paper or the like.

Figure 2:
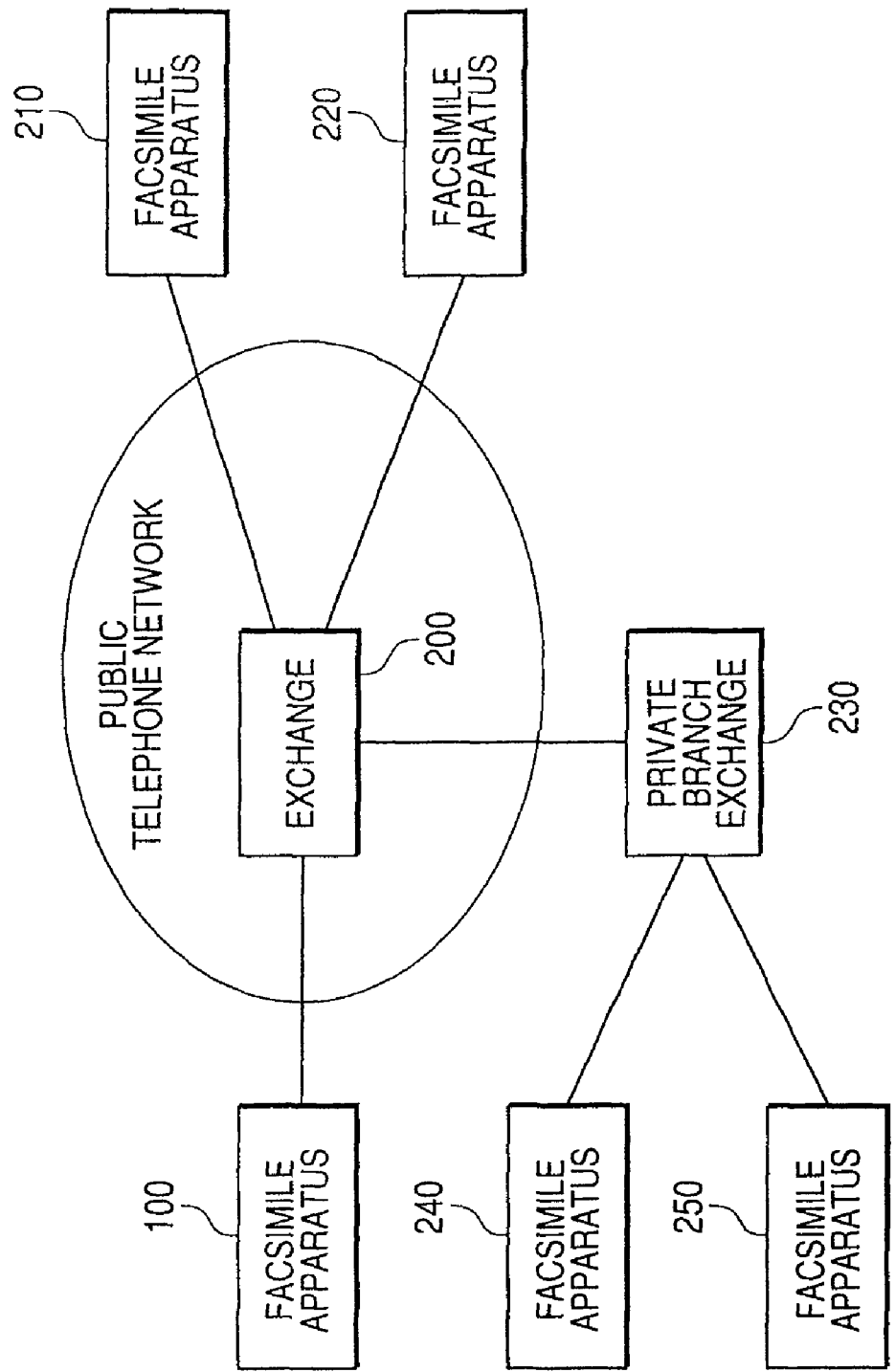
FIG. 2 is a block diagram illustrating a whole system including the facsimile apparatus according to the embodiment of the present invention.

FIG. 2 is a block diagram illustrating a whole system which includes the facsimile apparatus 100 to perform facsimile communication. For example, in a case where the facsimile apparatus 100 transmits facsimile data to a facsimile apparatus 210 or 220, such transmission is performed through an exchanging system 200 provided on a public telephone network. Each facsimile apparatus provides a (voice) phone call function using a telephone set, and thus performs, as well as the facsimile communication, phone call through the exchanging system. Incidentally, although FIG. 2 simply illustrates a case where only one exchanging system 200 is used, the communication is often performed through plural exchanging systems in practice.

Incidentally, as illustrated in FIG. 2, it should be noted that the exchanging system may include a different kind of exchanging system such as a private branch exchanging system 230 which is usually installed in a specific company, a specific school and the like. In FIG. 2, calling from each of facsimile apparatuses 240 and 250 is performed necessarily through the private branch exchanging system 230.

If the facsimile apparatus starts facsimile communication, it is necessary to first seize the telephone line between the relevant facsimile apparatus and a nearest exchanging system. That is, if the facsimile apparatus 100 performs facsimile communication, it is necessary to seize the line between the facsimile apparatus 100 and the exchanging system 200. Further, if the facsimile apparatus 240 performs facsimile communication, it is necessary to seize the line between the facsimile apparatus 240 and the private branch exchanging system 230. In any case, if such line seizing between the facsimile apparatus 100 and the exchanging system 200 is completed, the exchanging system 200 performs the line connection between the facsimile apparatus 100 and a terminal designated as a destination, based on dial information notified from the facsimile apparatus 100.

FIG. 3 is a flow chart for clearly describing a series of processes for transmitting facsimile data from the facsimile apparatus 100 through facsimile communication, according to the first embodiment. Here, it should be noted that the CPU 101 reads and performs a control program stored in the ROM 103, thereby controlling the series of processes in this flow chart.

In a step S301, a telephone number, which was input by a user through the operation unit 111, of a partner's terminal, which is a transmission destination of the facsimile data, is first received. Incidentally, how to input the destination of facsimile communication includes two types of methods, that is, one being an accumulation dialing type, in which the line is seized after all telephone numbers were input and then calling starts, and the other being a sequential dialing type, in which the line is first seized and then telephone numbers input by the user are sequentially transmitted for calling. In the first embodiment, an example that the facsimile transmission is performed by using the input method of accumulation dialing type will be described.

After the telephone number was received from the user in the step S301, it is determined in a subsequent step S302 whether or not a start of the facsimile transmission is instructed. More specifically, if a start button provided on the operation unit 111 is depressed by the user, then it is determined that the start of the facsimile transmission is instructed. Unless it is determined in the step S302 that the start of the facsimile transmission is instructed, the flow returns to the step S301 to successively receive a next telephone number.

On the other hand, if it is determined in the step S302 that the start of the facsimile transmission is instructed, the flow advances to a step S303 to seize the line between the facsimile apparatus 100 and the exchanging system 200 for use in the facsimile communication. After the line was seized, the flow further advances to a step S304 to detect presence/absence and a kind of signal received form the telephone line. In a subsequent step S305, the kind of signal detected in the step S304 is determined.

If it is determined in the step S305 that the received signal is a dial tone signal, the flow advances to a step S306 to transmit a dial signal of the partner's terminal being the destination and a CNG signal. Then, it is determined in a step S307 whether or not a CED signal is received from the partner's terminal. Here, if it is determined that the CED signal is received, the flow advances to a step S309 to transmit facsimile data by performing facsimile communication with the partner's terminal. Then, the flow further advances to a step S310 to release the line, and the process ends.

On the other hand, if it is determined in the step S307 that the CED signal is not received, the flow advances to a step S308 to determine whether or not a busy signal is received from the partner's terminal. Here, if it is determined that the busy signal is not received, the flow returns to the step S307 to monitor reception of the CED signal and reception of the busy signal. On the other hand, if it is determined in the step S308 that the busy signal is received, the flow further advances to the step S310 to release the line, and the process ends.

Incidentally, if it is determined in the step S305 that the signal transmitted from the exchanging system is a voice signal, facsimile communication is not performed. Instead, the flow directly advances to the step S310 to release the line, and the process ends. Besides, if it is determined in the step S305 that both the dial tone signal and the voice signal are not detected, that is, if a silent state is detected, the flow returns to the step S304 to further monitor reception of the dial tone signal or the voice signal.

In the first embodiment, as just described above with reference to the flow chart in FIG. 3, it is determined in the step S305 whether the signal received from the telephone line is the dial tone signal or the voice signal. Then, if it is determined that the received signal is the voice signal, any facsimile communication is not performed. Instead, the line is released, and then the process ends. On the other hand, if it is determined that the received signal is the dial tone signal, the facsimile communication is performed. Subsequently, the line is released, and the process ends.

Accordingly, even if a call for phone call is received from a terminal different from an original terminal at the same timing as that of the line seizing operation in case of transmitting the facsimile data and thus the line to the terminal different from the original terminal is connected, the voice signal transmitted for phone call can be discriminated from the dial tone signal. That is, it is possible to prevent that the facsimile data is erroneously transmitted to the terminal different from the original destination. In particular, even if the partner's terminal which has been erroneously connected has a function for automatically transmitting a CED signal if a CNG signal is received during phone call, it is possible to prevent that facsimile communication that the user does not intend is performed.

Subsequently, a mechanism for detecting the dial tone signal according to the first embodiment will be described in detail with reference to FIGS. 4A, 4B and 4C. That is, FIGS. 4A, 4B and 4C conceptually indicate plural kinds of signals which are represented in a case where their vertical axes correspond to signal levels (magnitudes) and their horizontal axes correspond to signal frequencies. Further, areas 411, 412 and 413, areas 421, 422 and 423, and areas 431, 432 and 433 respectively indicate signal detectable areas of respective filters provided for signal detection.

The areas 411, 421 and 431 respectively indicate the areas of signals capable of being detected by a first filter. More specifically, the first filter can detect the signals of which the levels are equal to or higher than a predetermined level (401) and which have frequency bands from F2 to F3. Incidentally, it is assumed that the frequency of the dial tone signal is included in the frequency band capable of being detected by the first filter.

Likewise, the areas 412, 422 and 432 respectively indicate the areas (ranges) of signals capable of being detected by a second filter. More specifically, the second filter can detect the signals of which the levels are equal to or higher than the predetermined level (401) and which have frequency bands from F1 to F2. Further, the areas 413, 423 and 433 respectively indicate the areas (ranges) of signals capable of being detected by a third filter. More specifically, the third filter can detect the signals of which the levels are equal to or higher than a predetermined level (401) and which have frequency bands from F3 to F4.

Figure 4A:
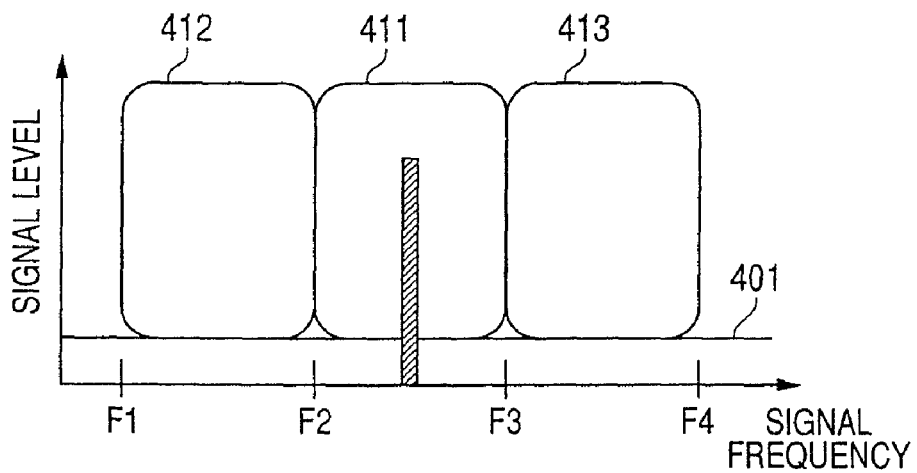
FIGS. 4A, 4B and 4C are conceptional diagrams illustrating a signal detection method according to the embodiment of the present invention.

FIG. 4A illustrates the dial tone signal. The frequency of the dial tone signal may be different according to a country where the relevant exchanging system has been installed, a kind of exchanging system, or a manufacturer of the exchanging system. With respect to the first filter, an arbitrary frequency band is set so as to detect the signals of the frequency band including the frequency of the dial tone signal to be detected. For this reason, if the signal received from the telephone line is the dial tone signal, as illustrated in FIG. 4A, only the signal of the frequency band capable of being detected by the first filter is detected, and any signal is not detected by the second filter and the third filter.

Figure 4B:
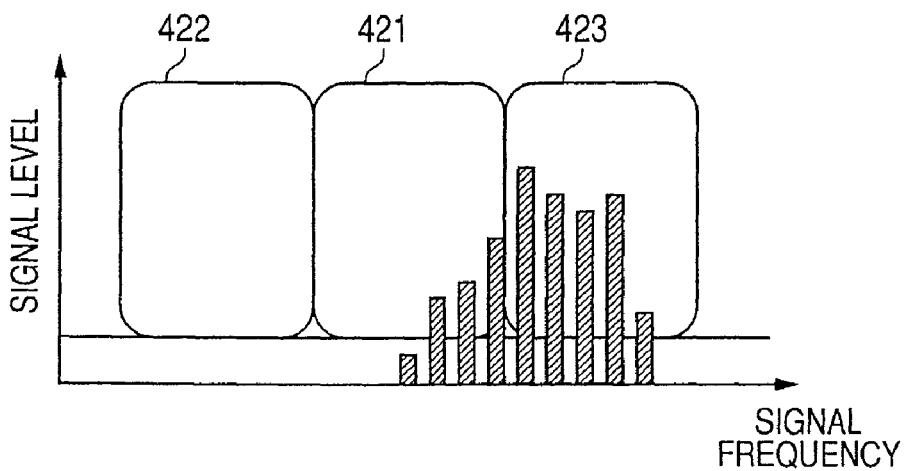

On the other hand, as illustrated in FIG. 4B, the voice signal includes the frequencies outside the frequency band capable of being detected by the first filter. That is, if the signal received from the telephone line is the voice signal, as illustrated in FIG. 4B, the signals are detected by the filter other than the first filter, that is, either the second filter or the third filter.

Figure 4C:
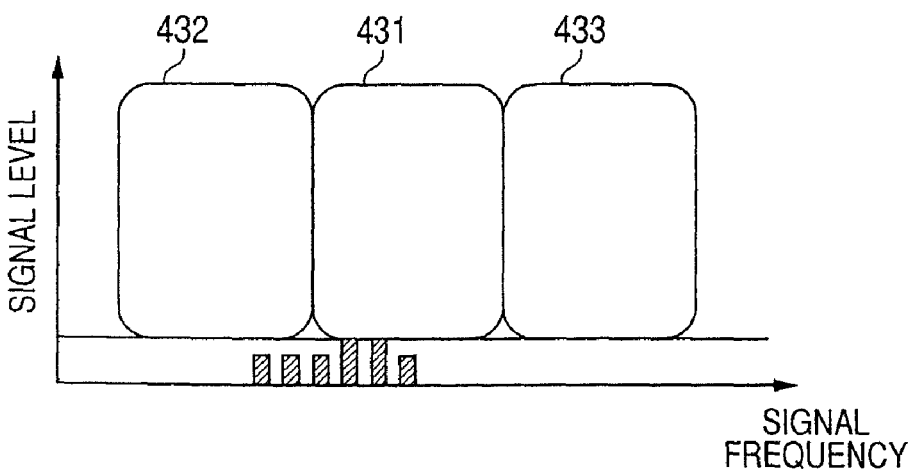

Further, in the silent state, that is, if there is no dial tone signal and no voice signal, as illustrated in FIG. 4C, there is no signal of which the signal level is equal to or higher than the predetermined signal level (401). That is, any signal is not detected by the first filter, the second filter and the third filter.

Conventionally, the dial tone signal is detected by only the first filter. In that case, as illustrated in FIG. 4A, if the dial tone signal is transmitted from the exchanging system, this signal is detected by the first filter. Thus, it is of course determined that the dial tone signal is properly transmitted from the exchanging system. However, as illustrated in FIG. 4B, even in a case where the voice signal is transmitted from the partner's terminal to which the line has been connected, if the signal capable of being detected by the first filter is included in the transmitted voice signal, it is resultingly determined that the dial tone signal is transmitted from the exchanging system. That is, the voice signal is erroneously recognized as the dial tone signal.

FIG. 5 is a flow chart for clearly describing the determination process of signal detection as in the step S304 of the flow chart illustrated in FIG. 3. More specifically, the determination of the step S304 as to the detected signal is performed by using the above-described first to third filters. Incidentally, it should be noted that, as well as the processes in the flow chart of FIG. 3, the CPU 101 reads and performs a control program stored in the ROM 103, thereby controlling the series of processes in the flow chart of FIG. 5.

Initially, it is determined in a step S501 whether or not the first filter detects a signal. If it is determined that the first filter detects the signal, the flow advances to a step S502 to determine whether or not either the second filter or the third filter detects a signal. If it is determined in the step S502 that neither the second filter nor the third filter detect the signal (that is, in the state illustrated in FIG. 4A), it is determined in a step S506 that the signal received from the telephone line is the dial tone signal.

On the other hand, if it is determined in the step S502 that either one of or both the second filter and the third filter detects or detect the signal (that is, in the state illustrated in FIG. 4B), it is determined in a step S505 that the signal received from the telephone line is the voice signal.

Further, if it is determined in the step S501 that the first filter does not detect the signal, the flow advances to a step S503 to determine whether or not either the second filter or the third filter detects the signal. Then, if it is determined in the step S503 that neither the second filter nor the third filter detect the signal (that is, in the state illustrated in FIG. 4C), it is determined in a step S504 that any signal is not received from the telephone line, that is, it is in a silent state.

On the other hand, if it is determined in the step S503 that either one of or both the second filter and the third filter detects or detect the signal (not illustrated), it is determined in the step S505 that the signal received from the telephone line is the voice signal.

Incidentally, in the present embodiment, in order to detect the dial tone signal, as well as the first filter for detecting the signal of the frequency band including the frequency of the dial tone signal, the second filter and the third filter for detecting the signals of its nearby frequency bands are provided. However, it should be noted that each of the second and third filters need not necessarily be provided independently. That is, only either one of the second and third filters may be provided. Further, the functions achieved by the second and third filters may be integrated into the function achieved by a single filter. Furthermore, as described above, any kind of filter can be used if it can discriminably detect the dial tone signal and the voice signal.

As just described, according to the first embodiment, the facsimile apparatus includes the first filter for detecting the signal of the frequency band including the frequency of the dial tone signal, and the filters (the second filter and the third filter) for detecting the signals of the frequency bands different from the frequency band capable of being detected by the first filter.

Accordingly, even in the case where the first filter detects the signal, if the second filter or the third filter detects the signal, the signal received from the telephone line after the line was seized can be determined as the voice signal. Further, in the case where the first filter detects the signal but the second filter does not detect the signal, the signal received from the telephone line after the line was seized can be determined as the dial tone signal. That is, it is possible to prevent that the voice signal for phone call is erroneously detected as the dial tone signal. In particular, even if the partner's terminal which has been erroneously connected has the function for automatically transmitting the CED signal if the CNG signal is received during phone call, it is possible to prevent that the facsimile communication that the user does not intend is performed.

Second Embodiment

Subsequently, in addition to the method, described in the first embodiment, of discriminably detecting the dial tone signal and the voice signal by using the frequency of the signal received from the telephone line, a case of performing determination based on a length of a continuously detected signal will be described in the second embodiment. Incidentally, since the basic constitution in the second embodiment is substantially the same as that in the first embodiment, descriptions of the constitution in the present embodiment will be omitted.

FIG. 6 is a flow chart for describing in detail the determination process of signal detection as in the step S304 of the flow chart illustrated in FIG. 3. More specifically, the determination of the step S304 as to the detected signal is performed by using the above-described first to third filters. Incidentally, it should be noted that, as well as the processes in the flow chart of FIG. 3, the CPU 101 reads and performs a control program stored in the ROM 103, thereby controlling the series of processes in the flow chart of FIG. 6.

Here, since steps S601, S602, S603, S604, S605 and S606 in the flow chart of FIG. 6 respectively correspond to the steps S501, S502, S503, S504, S505 and S506 in the flow chart of FIG. 5, the description thereof will be omitted. That is, the second embodiment (the flow chart of FIG. 6) is different from the first embodiment (the flow chart of FIG. 5) in a point that a determination step is added as a step S607 to the flow chart of FIG. 6.

In the flow chart of FIG. 6, if it is detected in the step S601 that the first filter detects a signal and it is further detected in the step S602 that neither the second filter nor the third filter detect a signal, the flow advances to the step S607. In the step S607, it is determined, based on a time measurement result by a timer unit (FIG. 1), whether or not a predetermined time elapses after the first filter began to detect the signal.

In the first embodiment, in the case where only the first filter detects the signal and neither the second filter nor the third filter detect the signal even if it is a moment, the detected signal is determined as the dial tone signal. However, there is a possibility that even the voice signal includes a signal capable of being detected by only the first filter at an initial moment. In consideration of such a case, in the second embodiment, if the first filter continuously detects the signal during a certain time (that is, for a time longer to some extent) and neither the second filter nor the third filter detect the signal during the relevant time, the detected signal is determined as the dial tone signal.

If it is determined in the step S607 that the predetermined time elapses after the first filter began to detect the signal, the flow advances to the step S606 to determine the signal received from the telephone line as the dial tone signal. On the other hand, if it is determined in the step S607 that the predetermined time does not elapse after the first filter began to detect the signal, the flow returns to the step S601.

As just described, in the second embodiment, even in the case where the signal which satisfies the condition to be determined as the dial tone signal is detected by using the first to third filters, the relevant signal is not determined as the dial tone signal if it is not continuously detected for the predetermined time.

That is, even if the signal which satisfies the condition to be determined as the dial tone signal is detected in moment, it is impossible only by such a fact to completely determine that the detected signal is the dial tone signal. Accordingly, the determination concerning the detected signal is not performed at this stage. After then, if the signal which satisfies the relevant condition is continuously detected for the predetermined time, it is determined that the dial tone signal has been received. In other words, if the first filter comes not to detect the signal or either the second filter or the third filter detects the signal before it becomes the predetermined time, it is determined that the detected signal is not the dial tone signal.

Accordingly, in addition to the effect obtained in the first embodiment, it is possible in the present embodiment to more precisely discriminate between the dial tone signal and the voice signal.

Third Embodiment

Subsequently, in addition to the methods, described in the first and second embodiments, of discriminably detecting the dial tone signal and the voice signal by using the frequency of the signal received from the telephone line and the signal continuous detecting time respectively, a case of performing determination based on on/off patterns of a signal will be described in the third embodiment. Incidentally, since the basic constitution in the third embodiment is substantially the same as that in each of the first and second embodiments, descriptions of the constitution in the present embodiment will be omitted.

Figure 7:
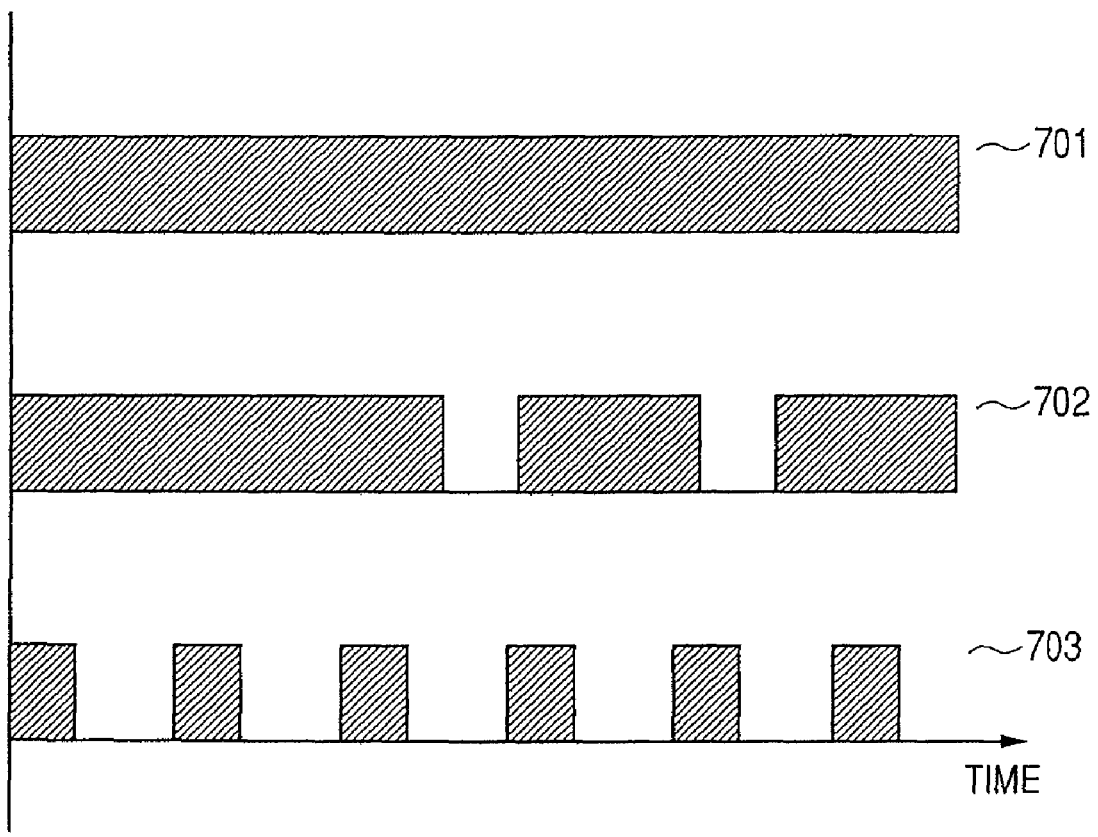
FIG. 7 is a diagram illustrating patterns of the dial tone signals according to the embodiment of the present invention.

FIG. 7 is a diagram illustrating patterns of the dial tone signals. The pattern of the dial tone signal may be different according to a country where the exchanging system has been installed, a kind of exchanging system, or a manufacturer of the exchanging system. For example, in FIG. 7, a signal pattern 701 indicates a case where the dial tone signal is a continuous signal having certain magnitude, a signal pattern 702 indicates on/off patterns in a case where the dial tone signal is a signal intermittently repeated at a certain period, and a signal pattern 703 indicates on/off patterns in a case where the dial tone signal is a signal intermittently repeated at a period shorter than the period of the signal pattern 702.

In the third embodiment, the determination of the on/off patterns is added to the determination method described in the first embodiment. More specifically, in the case where the first filter detects the signal and either the second filter or the third filter detects the signal, the on/off patterns of the signal is further determined. In other words, even in a case where either the second filter or the third filter detects the signal, if the pattern of the signal detected by the first filter conforms to the specific pattern of the dial tone signal, the signal received from the exchanging system is determined as the dial tone signal.

Figure 8:
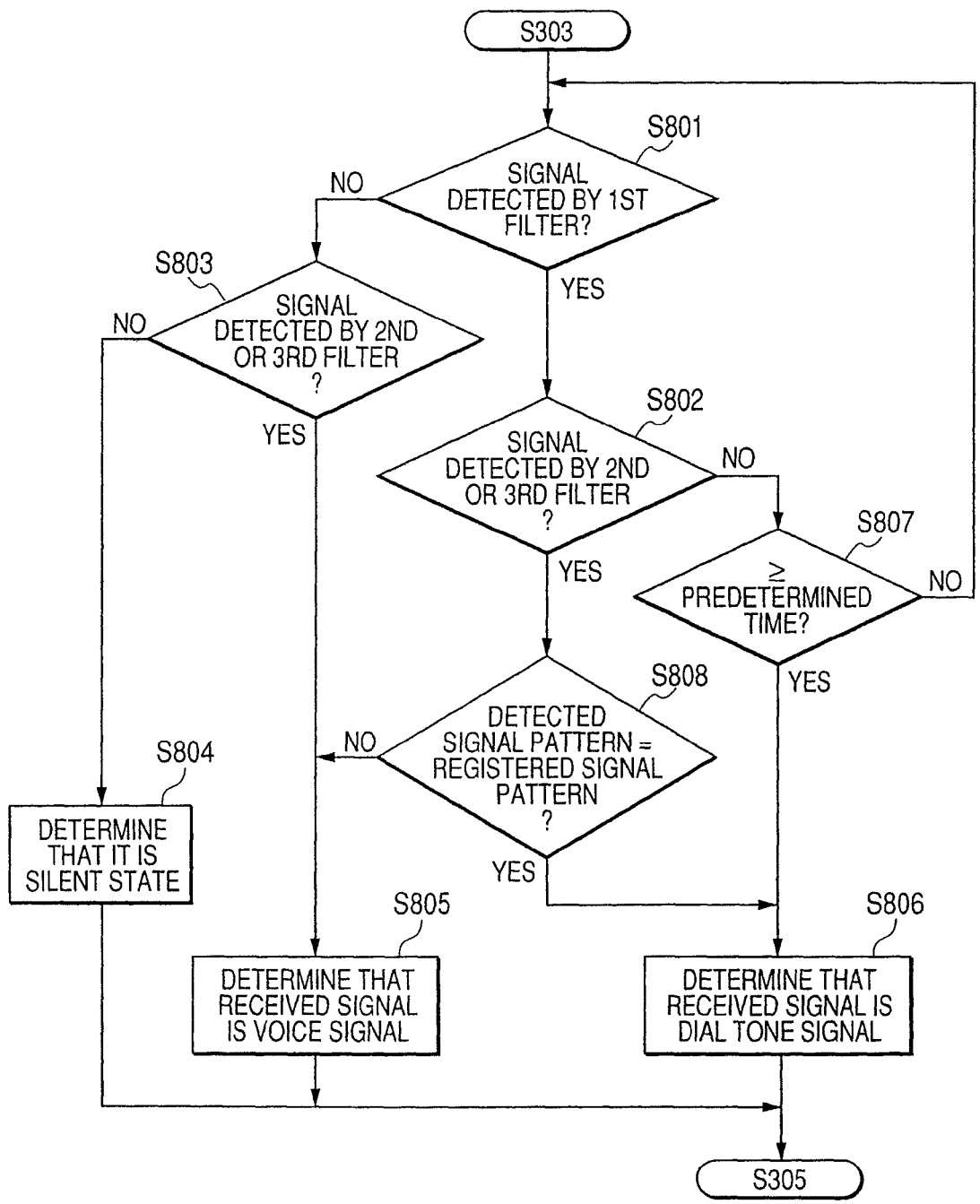
FIG. 8 is a flow chart for clearly describing a series of processes for determining the dial tone signal or the voice signal according to the embodiment of the present invention.

FIG. 8 is a flow chart for describing in detail the determination process of signal detection as in the step S304 of the flow chart illustrated in FIG. 3. More specifically, the determination of the step S304 as to the detected signal is performed by using the above-described first to third filters. Incidentally, it should be noted that, as well as the processes in the flow chart of FIG. 3, the CPU 101 reads and performs a control program stored in the ROM 103, thereby controlling the series of processes in the flow chart of FIG. 8.

Here, since steps S801, S802, S803, S804, S805, S806 and S807 in the flow chart of FIG. 8 respectively correspond to the steps S601, S602, S603, S604, S605, S606 and S607 in the flow chart of FIG. 6, the description thereof will be omitted. That is, the third embodiment (the flow chart of FIG. 8) is different from the second embodiment (the flow chart of FIG. 6) in a point that a determination step is added as a step S808 to the flow chart of FIG. 8.

In the flow chart of FIG. 8, if it is detected in the step S801 that the first filter detects a signal and it is further detected in the step S802 that either the second filter or the third filter detects the signal, the flow advances to the step S808. In the step S808, the pattern of the signal detected by the first filter is compared with the pattern of the dial tone signal previously registered and stored in the ROM 103 or the memory 105 (FIG. 1). More specifically, if the plural patterns of the dial tone signal have been previously registered and stored, the pattern of the detected signal is compared with each of the registered and stored patterns.

Then, if it is determined in the step S808 that the pattern of the signal detected by the first filter conforms to the pattern of the dial tone signal previously registered and stored, the flow advances to the step S806 to determine the signal received from the telephone line as the dial tone signal. On the other hand, if it is determined in the step S808 that the pattern of the signal detected by the first filter does not conform to the pattern of the dial tone signal previously registered and stored, the flow advances to the step S805 to determine the signal received from the telephone line as the voice signal.

As just described, according to the third embodiment, even if the first filter detects the signal and either the second filter or the third filter detects the signal, the signal received from the telephone line is not immediately determined as the voice signal. Instead, the signal pattern of the received signal is further compared with the previously registered pattern.

Thus, even if the dial tone signal is actually received from the exchanging system, it is possible to prevent that the received dial tone signal is erroneously determined as the voice signal due to some reasons such as interfusion of some noises, and the like.

Fourth Embodiment

Subsequently, the fourth embodiment will be described. In the first embodiment, if the signal received from the telephone line is determined as the voice signal, it is controlled not to perform the facsimile communication. However, if the signal received from the telephone line is determined as the dial tone signal, it is controlled to perform the facsimile communication.

On the other hand, in the fourth embodiment, if the signal received from the telephone line is determined as the voice signal, a notification is transmitted to a user for phone call by the telephone set, and the data intended to be subjected to facsimile transmission is set to be in a redialing standby state. Further, even in the case where the dial tone signal is received from the exchanging system, if a busy signal is received from a destination terminal, the data intended to be subjected to facsimile transmission is likewise set to be in the redialing standby state.

Figure 9:
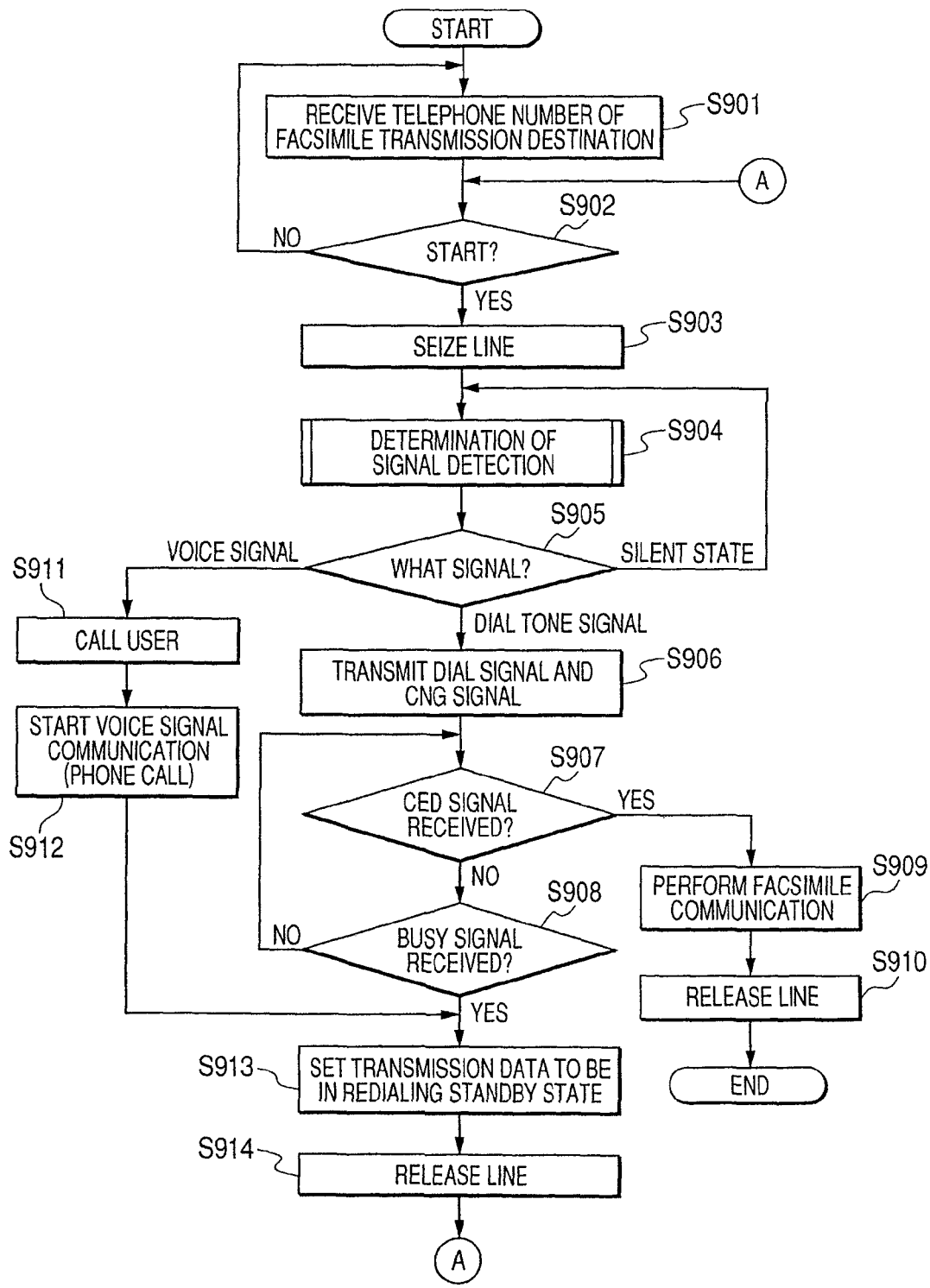
FIG. 9 is a flow chart for clearly describing a series of processes for transmitting the facsimile data according to the embodiment of the present invention.
Figure 10:
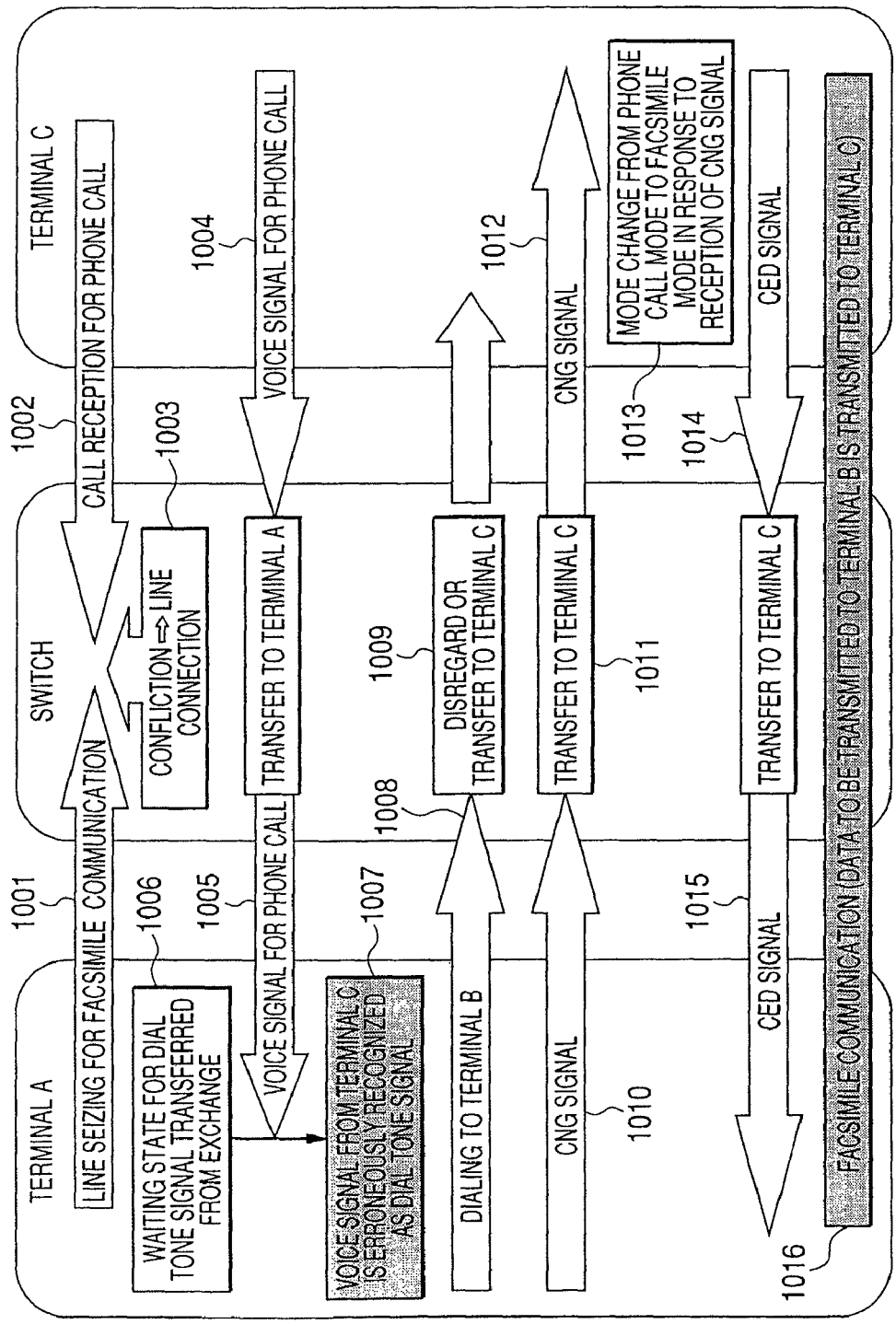
FIG. 10 is a conceptional diagram illustrating the problem which occurs in the related art.

FIG. 9 is a flow chart for describing in detail a series of processes for transmitting the facsimile data from the facsimile apparatus 100 through facsimile communication, according to the fourth embodiment. Here, it should be noted that the CPU 101 reads and performs a control program stored in the ROM 103, thereby controlling the series of processes in this flow chart.

Here, since steps S901, S902, S903, S904, S905, S906, S907, S908, S909 and S910 in the flow chart of FIG. 9 respectively correspond to the steps S301, S302, S303, S304, S305, S306, S307, S308, S309 and S310 in the flow chart of FIG. 3, the description thereof will be omitted. That is, the fourth embodiment (the flow chart of FIG. 9) is different from the first embodiment (the flow chart of FIG. 3) in a point that a series of steps is added as steps S911, S912, S913 and S914 to the flow chart of FIG. 9.

In the flow chart of FIG. 9, if it is determined in the step S905 that the signal received from the exchanging system is the voice signal, the flow advances to the step S911 to notify the user of such a fact by a call for phone call. More specifically, a calling bell of the telephone set 119 is rung to notify the user that the call for phone call was received. After then, if the user responds to the call, voice signal communication (that is, phone call by the telephone set) starts (step S912). On the other hand, if the user does not respond to the call, a message recording function provided in the telephone set 119 may be activated.

In the subsequent step S913, the facsimile data that the user of the facsimile apparatus 100 originally intends to transmit is set to be in the redialing standby state. Further, the flow advances to the step S914 to release the line which was seized in the step S903. After the line was released, the flow returns to the step S902 to further monitor the signal reception until a start instruction is issued. Incidentally, it is assumed that the start instruction is determined in the step S902 when a start button is depressed by the user, and it is further assumed that the start instruction is determined in the step S913 when it becomes a redialing start time for the facsimile data being in the redialing standby state.

As just described, according to the fourth embodiment, in the case where the user tries to transmit the facsimile data, if the line seizing for facsimile notification conflicts with the call reception for phone call, it is possible to call the user for phone call. Thus, the user can perform the phone call. In addition, since the facsimile data that the user originally intends to transmit is set to be in the redialing standby state during the phone call, it is possible to prevent that the relevant facsimile data is erroneously transmitted and/or erased. That is, since the facsimile data in the redialing standby state is automatically transmitted anew after the phone call ended, it is possible to improve usability of the facsimile apparatus.

Other Embodiments

Although the embodiments of the present invention are described as above, the present invention can also be applied to, for example, a system, an apparatus, a method, a program, a storage medium (recording medium), or the like. More specifically, the present invention may be applied to a system which includes plural devices, or to an apparatus which includes a single device.

Furthermore, the present invention also includes a case where program codes of software for achieving the functions of the above-described embodiments (that is, the programs corresponding to the illustrated flow charts in the actual embodiments) are directly or remotely supplied to a system or an apparatus and a computer provided in the system or the apparatus reads and executes the supplied program codes to achieve the relevant functions.

Accordingly, also the program codes themselves installed into the computer to achieve the functional processes of the present invention by the computer achieve the present invention. In other words, the present invention includes also the computer program itself for achieving the functional processes of the present invention.

In that case, because the form of program is no object if it has an actual function as the program, an object code, a program executed by an interpreter, script data supplied to an OS, and the like may be included as the program.

As the storage medium for supplying the program codes, for example, a Floppy™ disk, a hard disk, an optical disk, a magnetooptical (MO) disk, a CD-ROM, a CD-R, a CD-RW, a magnetic tape, a nonvolatile memory card, a ROM, a DVD (DVD-ROM, DVD-R), or the like can be used.

Besides, as a method of supplying programs, there is a method of connecting with a website on the Internet by using a browser of a client computer, and downloading the computer program itself of the present invention or a compressed file including an automatic installing function together with the computer program into the recording medium such as a hard disk or the like. Moreover, there is a method of dividing the program codes constituting the program of the present invention into plural files and downloading the respective files from different websites. That is, a WWW server for downloading the program files for achieving the functional processes of the present invention with use of the computer to plural users is included in the scope of the present invention.

Moreover, it is possible to encrypt the program of the present invention, store the encrypted program in a storage medium such as a CD-ROM or the like, distribute the acquired storage media to users, cause the user who has satisfied a predetermined condition to download key information for decrypting the encrypted program from a website through the Internet, cause the relevant user to install the decrypted program into an appropriate computer, and thus achieve the functional processes of the present invention.

Moreover, the present invention includes not only a case where the functions of the above-described embodiments are achieved by executing the program read by the computer, but also a case where an OS or the like functioning on the computer executes a part or the whole of the actual process according to instructions of the program, whereby the functions of the above-described embodiments are achieved by the relevant process.

In addition, the functions of the above-described embodiments can be achieved also in a case where the program read from the storage medium is once written in a memory provided in a function expansion board inserted in the computer or a function expansion unit connected to the computer, and then a CPU or the like provided in the function expansion board or the function expansion unit executes a part or the whole of the actual process according to the instructions of the program.

While the present invention has been described with reference to the exemplary embodiments, it is to be understood that the present invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-278917, filed Oct. 12, 2006, which is hereby incorporated by reference herein in its entirety.

What is claimed is:

1. A facsimile apparatus comprising:
a communication unit configured to perform facsimile communication;
a line seizing unit configured to seize a public line in order to transmit facsimile data by the facsimile communication;
a determining unit configured to determine, in a case where said line seizing unit has seized the public line, which of a dial tone signal or a voice signal for a phone call a signal received from the public line is;
a control unit configured to control said communication unit
to perform the facsimile communication in a case where the received signal is determined as the dial tone signal, and
not to perform the facsimile communication in a case where the received signal is determined as the voice signal;
a first detection unit configured to detect the received signal of a first frequency band including a frequency of the dial tone signal; and
a second detection unit configured to detect the received signal of a second frequency band different from the first frequency band,
wherein said determining unit
determines the received signal as the voice signal in a case where said first detection unit detects the received signal and said second detection unit detects the received signal, and
determines the received signal as the dial tone signal in a case where said first detection unit detects the received signal and said second detection unit does not detect the received signal.

2. A facsimile apparatus according to claim 1, wherein the voice signal is the voice signal that a terminal which generated the phone call to the facsimile apparatus transmits to the facsimile apparatus in a case where said line seizing unit seizes the public line.

3. A facsimile apparatus according to claim 1, wherein, in a case where said first detection unit does not detect the received signal, said control unit controls said communication unit not to perform the facsimile communication.

4. A facsimile apparatus according to claim 1, further comprising a timer unit adapted to measure a time for which said first detection unit continuously detects the received signal,
wherein, based on a result of the measurement by said timer unit, in a case where said first detection unit continuously detects the received signal at least for a predetermined time and said second detection unit does not detect the received signal, said determining unit determines the received signal as the dial tone signal.

5. A facsimile apparatus according to claim 4, wherein, even in the case where said first detection unit detects the received signal and said second detection unit does not detect the received signal, in a case where the received signal detected by said first detection unit does not continue for the predetermined time based on the result of the measurement by said timer unit, said determining unit determines the received signal as not a dial tone signal.

6. A facsimile apparatus according to claim 1, further comprising a storage unit configured to store on/off patterns of the dial tone signal in advance,
wherein, in a case where said first detection unit detects the received signal of a pattern conforming to a signal pattern stored in said storage unit, said determining unit determines the received signal as the dial tone signal even if said second detection unit has detected the received signal.

7. A facsimile apparatus according to claim 1, wherein, in a case where said determining unit determines the received signal as the voice signal, said control unit further performs control to release the public line seized by said line seizing unit and set the data to be transmitted by the facsimile communication to be in a redialing standby state.

8. A facsimile apparatus according to claim 1, further comprising a notification unit configured to perform, in a case where said determining unit determines the received signal as the voice signal, notification to call a user.

9. A control method for a facsimile apparatus, comprising the steps of:
performing facsimile communication;
seizing a public line in order to transmit facsimile data by the facsimile communication;
determining, in a case where the public line was seized in said line seizing step, which of a dial tone signal or a voice signal for a phone call a signal received from the public line is;
controlling said communication step
to perform the facsimile communication in a case where the received signal is determined as the dial tone signal, and
not to perform the facsimile communication in a case where the received signal is determined as the voice signal;
detecting the received signal of a first frequency band including a frequency of the dial tone signal; and
detecting the received signal of a second frequency band different from the first frequency band,
wherein said determining step
includes determining the received signal as the voice signal in a case where said first detection step detects the received signal and said second detection step includes detecting the received signal, and
includes determining the received signal as the dial tone signal in a case where said first detection step detects the received signal and said second detection step does not detect the received signal.

10. A control method according to claim 9, wherein the voice signal is the voice signal that a terminal which generated the phone call to the facsimile apparatus transmits to the facsimile apparatus in a case where said line seizing step seizes the public line.

11. A control method according to claim 9, wherein, in a case where said first detection step does not detect the received signal, said control step controls communication step not to perform the facsimile communication.

12. A control method according to claim 9, further comprising the step of measuring a time for which said first detection step continuously detects the received signal,
   wherein, based on a result of the measurement in said measuring step, in a case where said first detection step continuously detects the received signal at least for a predetermined time and said second detection step does not detect the received signal, said determining step determines the received signal as the dial tone signal.

13. A control method according to claim 12, wherein, even in the case where said first detection step detects the received signal and said second detection step does not detect the received signal, in a case where the received signal detected in said first detection step does not continue for the predetermined time based on the result of the measurement in said measuring step, said determining step determines the received signal as not a dial tone signal.

14. A control method according to claim 9, further comprising the step of storing on/off patterns of the dial tone signal in a storage medium in advance,
   wherein, in a case where said first detection step detects the received signal of a pattern conforming to a signal pattern stored in said storage step, said determining step determines the received signal as the dial tone signal even if said second detection step has detected the received signal.

15. A control method according to claim 9, wherein, in a case where said determining step determines the received signal as the voice signal, said control step further performs control to release the public line seized in said line seizing step and set the data to be transmitted by the facsimile communication to be in a redialing standby state.

16. A control method according to claim 9, further comprising the step of performing, in a case where said determining step determines the received signal as the voice signal, notification to call a user.

17. A non-transitory computer-readable storage medium which stores therein a program for causing a computer to perform a control method for a facsimile apparatus, the method comprising the steps of:
   performing facsimile communication;
   seizing a public line in order to transmit facsimile data by the facsimile communication;
   determining, in a case where the public line was seized in said line seizing step, which of a dial tone signal or a voice signal for a phone call a signal received from the public line is;
   controlling said communication step
      to perform the facsimile communication in a case where the received signal is determined as the dial tone signal, and
      not to perform the facsimile communication in a case where the received signal is determined as the voice signal;
   detecting the received signal of a first frequency band including a frequency of the dial tone signal; and
   detecting the received signal of a second frequency band different from the first frequency band,
   wherein said determining step
      includes determining the received signal as the voice signal in a case where said first detection step detects the received signal and said second detection step detects the received signal, and
      includes determining the received signal as the dial tone signal in a case where said first detection step detects the received signal and said second detection step does not detect the received signal.

* * * * *